Aug. 5, 1969  D. A. WHEELER  3,458,894
MIXING APPARATUS
Filed Sept. 13, 1966  3 Sheets-Sheet 2
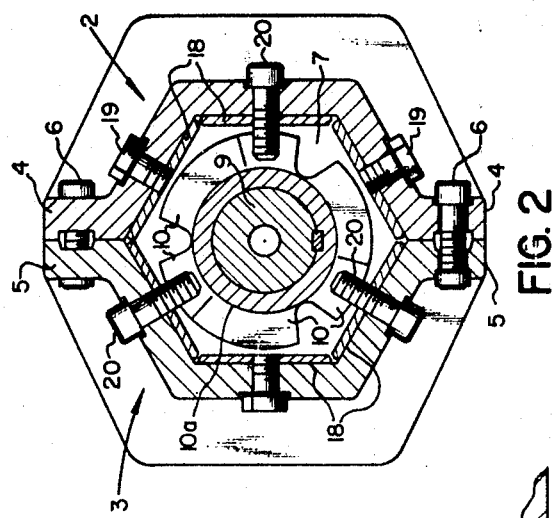
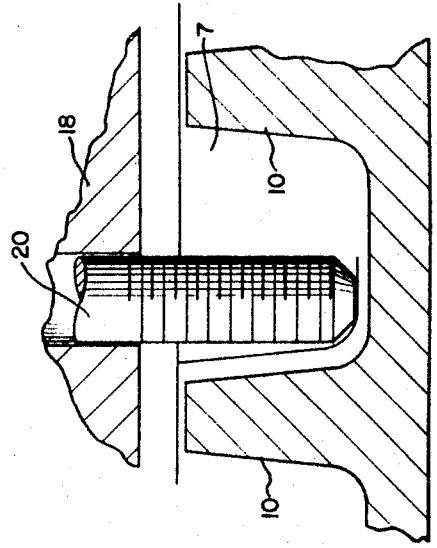
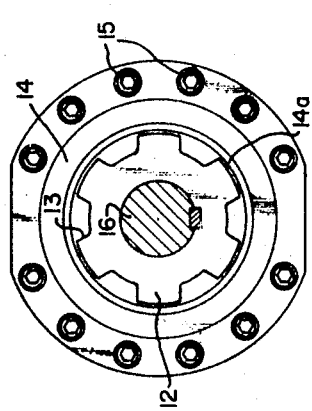
INVENTOR.
DENNIS A. WHEELER
BY
Learman, Learman & McCulloch
ATTORNEYS Aug. 5, 1969    D. A. WHEELER    3,458,894
MIXING APPARATUS
Filed Sept. 13, 1966    3 Sheets-Sheet 3

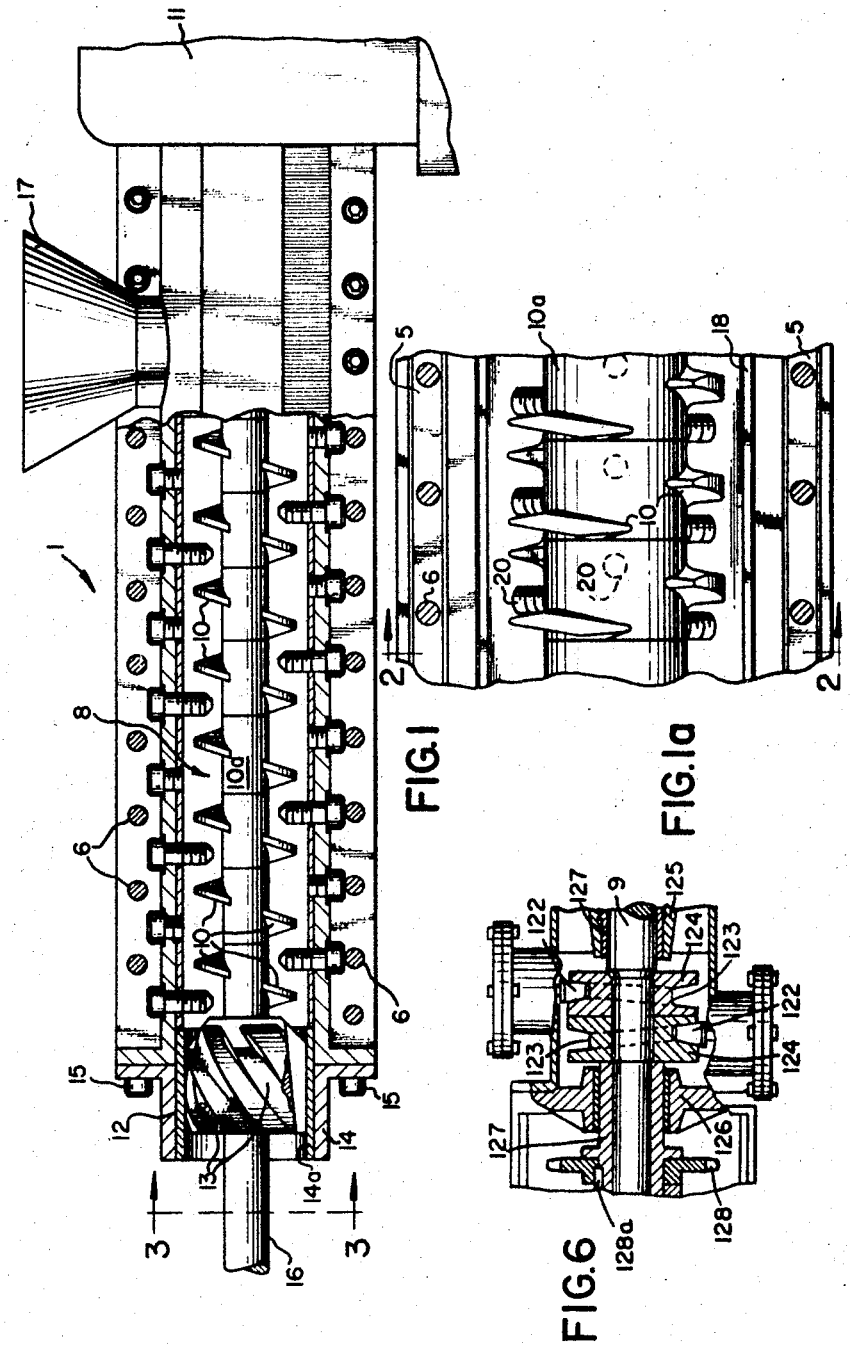

INVENTOR.
DENNIS A. WHEELER
BY
Learman, Learman & McCulloch
ATTORNEYS

United States Patent Office 3,458,894
Patented Aug. 5, 1969

3,458,894
MIXING APPARATUS
Dennis A. Wheeler, Saginaw, Mich., assignor to Baker Perkins, Inc., Saginaw, Mich., a corporation of New York
Filed Sept. 13, 1966, Ser. No. 579,030
Int. Cl. B28c 5/14; A21c 1/14
U.S. Cl. 18—2     11 Claims

ABSTRACT OF THE DISCLOSURE

Mixing apparatus wherein a tubular barrel has generally axially split liner means comprising a plurality af non-continuous separate removable members making up a perimetral surface removably secured to the interior of the barrel and forming a mixing chamber, a rotating and reciprocating mixer shaft is mounted within the mixing chamber, interrupted flight mixing blades are provided on the shaft and lugs are mounted to extend into the mixing chamber from the liner means, adjacent the interrupted portions of said blade means and in position such that the interrupted blades clear the lugs during the rotation and reciprocating movement.

MIXING APPARATUS

This invention relates to mixing apparatus and more particularly to a mixer having a rotatable and simultaneously reciprocable mixing blade assembly that is especially adapted for use in the continuous mixing of plastic, pseudo-plastic and dough-like materials.

Mixing constructions of the general class to which the invention relates have been proposed heretofore and have been found to be especially advantageous in the continuous intermixing of a combination of plastic ingredients. Heretofore, however, the use of such mixers in the mixing of abrasive or corrosive materials has presented problems in the maintenance of such mixers. Moreover, the mixers previously in use have been subject to undue wear during operation at less than optimum feed conditions. The frequency and scope of maintaining and repairing such mixers are important considerations in the manufacture and use of mixing machinery and considerable effort has been made heretofore to provide mixers having improved longevity and which are capable of easy maintenance.

An object of this invention is to provide a mixer which retains the advantages of combined rotary and reciprocatory mixing characteristics and which, for certain situations, overcomes or greatly minimizes the disadvantages of mixers of the same general class in use heretofore.

Another object if the invention is to provide a mixer construction which is better suited for the mixing of abrasive and corrosive materials than are previously known mixers.

A further object of the invention is to provide a mixer construction employing a barrel design which facilitates control over the temperature of the materials being mixed.

Another object of the invention is to provide a mixer construction having removable inner liner members which may be replaced when they become worn and without necessitating the discarding or refinishing of the barrel walls.

Another object of the invention is to provide a mixer construction having removable shaft segments which may be replaced when they become worn without the necessity of discarding the shaft.

Another object of the invention is to provide a mixer having a barrel design such that material contained in the barrel forms a support for the mixing blade member during mixing operations.

A further object of the invention is to provide means for removably holding the barrel liner members in place and which also are capable of providing counter working members for cooperation with the mixing blade member.

Another object of the invention is to provide mixing apparatus having a barrel made of identical half-sections, thereby reducing the cost of original manufacture and replacement.

Other objects and advantages of the invention will be pointed out specifically or will become apparent from the following description when it is considered in conjunction with the appended claims and the accompanying drawings, in which:

FIGURE 1 is a fragmentary view, partly in side elevation and partly in section, of a mixer constructed in accordance with the invention;

FIGURE 1a is a similar fragmentary view of a mixer employing slightly different mixer shaft flights;

FIGURE 2 is a transverse sectional view taken on the line 2—2 of FIGURE 1a;

FIGURE 3 is a sectional view taken on the line 3—3 of FIGURE 1;

FIGURE 4 is an enlarged, sectional view illustrating a detail of the apparatus;

FIGURE 6 is a sectional, side elevational view illustrating one manner in which the mixing shaft may be simultaneously revolved and reciprocated.

Figure 5:
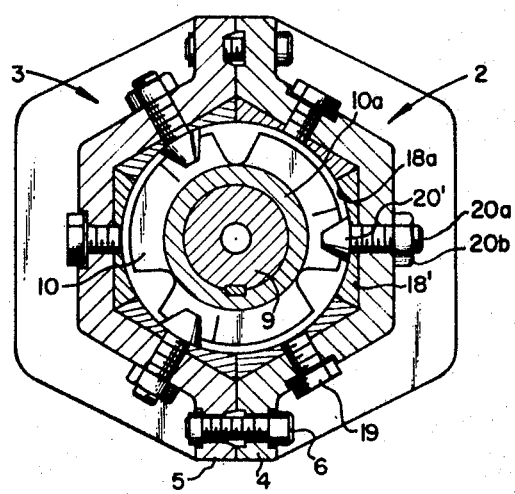
FIGURE 5 is a view similar to FIGURE 2 wherein the liner plates and stationary kneading teeth are of modified form.

A mixer constructed in accordance with the invention possesses many of the characteristics disclosed in Patent No. 3,023,455, granted Mar. 6, 1962, and to which reference may be had for certain operating characteristics not specifically disclosed herein.

The mixer disclosed herein in FIGURES 1–4 comprises a tubular barrel 1 formed of two multi-sided sections 2 and 3 having confronting flanges 4 and 5, respectively, joined together in face-to-face engagement by means of bolts 6 so as to provide an elongated mixing chamber 7 having a polygonal inner surface corresponding to the number of sides provided by the sections 2 and 3. In the disclosed embodiment, the chamber 7 has six uniform sides, but it may have a fewer or greater number of sides.

Mounted within the barrel 1 is a mixer blade or screw assembly 8 comprising a shaft 9 to which is keyed a sleeve 10a having interrupted, helical vanes or flights 10 cast thereon or welded thereto and projecting radially therefrom. The sleeve 10a in FIGURE 1 is preferably made up of a plurality of short sleeve sections, each containing a pair of vane members 10, arranged in end-to-end relation on the shaft 9 and the sleeve 10a in FIGURE 2 is made up of similar sections, each containing three flights. One end of the shaft 9 is mounted in a drive assembly 11 for rotation and reciprocation by apparatus which is of the type shown in Patent No. 3,023,455. As shown in FIGURE 6 the housing rearwardly of the feed hopper 17 is provided with a pair of fixed cam follower projections 122 which ride in cam tracks 123 provided in a pair of side-by-side cams 124 which are keyed on the rear end of mixer shaft 9 as shown. As the shaft 9 is revolved by a motor (not shown) through a suitable gear reduction unit (not shown) the rotary travel of the cams 124, which are fixed on shaft 9, causes the shaft 9 to have an oscillating stroke.

At its rear end the shaft portion 9 is supported in bearings 125 and 126, and fixed to the shaft 9 is shown, to revolve and reciprocate with it, are wear sleeves 127. An axially stationary gear 128 keyed as at 128a on the rear slide bearing 127 is connected through a suitable gear reduction unit to the drive motor and drives the rear sleeve 127 and shaft 9. To the other end of the shaft 9 is fixed a suitable plug 12 having helical flutes 13 formed therein and which is accommodated in the annular liner 14a of an annular discharge member 14 which has a discharge opening of circular cross-section and of lesser diameter than that of the chamber 7. The member 14 may be secured to the barrel 1 by bolts 15 or the like. Also fixed to the plug 12 on the larger machine is one end of an extension shaft 16 which projects beyond the discharge end of the barrel.

Adjacent the opposite end of barrel 1 is an inlet opening in communication with the chamber 7 and which may be surrounded by a hopper 17. The arrangement is such that materials to be mixed and kneaded may be introduced to the chamber 7 via the hopper 17 and be advanced longitudinally of the barrel 1 by the combined rotation and reciprocation of the mixing screw 8.

Apparatus constructed in accordance with the invention comprises a plurality of flat liner members 18 corresponding in number to the number of sides of the barrel 1 and being mounted within the latter so as to define the inner surface of the chamber 7. Each liner member 18 may be coextensive in length with the barrel 1, if desired, or the inner surface of the chamber at each side thereof may be formed by a plurality of liner plates arranged in end-to-end relation. In either event, it is preferred that the liner members 18 be removable. Accordingly, movable bolts 19 and 20 are accommodated in smooth bores formed in the members 2 and 3 and extend into threaded openings formed in the liner members 18 so as to hold the latter firmly against the inner surfaces of the members 2 and 3. As is best indicated in FIGURES 1 and 2, the bolts 19 are shorter than the bolts 20 and alternate with the latter. The bolts 20 extend into the chamber 7 between adjacent blade portions 10 so as to provide members which work or knead material in the mixing chamber counter to the forces applied to such material by the blade portions 10.

As is best shown in FIGURE 2, the several liner members 18 are so arranged that their adjacent edges confront one another, thereby enabling their flat, inner faces to define contiguous chords about the axis of the screw assembly 8, the chordal dimension of each liner being substantially uniform. The diameter of the blade members 10 corresponds substantially to the shortest radial distance between the axis of the shaft 9 and any liner 18. Thus, between any two adjacent liners is a generally triangularly-shaped valley.

In the operation of the apparatus, material is fed to the mixing chamber 7 via the hopper 17 and is mixed, kneaded, and advanced toward the discharge end of the barrel 1 by the rotation of the screw assembly 10. As the shaft 9 rotates, it reciprocates fore and aft of the barrel, whereupon the material in the mixing chamber is kneaded by the action and counter action of the blades 10 and the projecting members 20, respectively. As material is introduced to the chamber 7, it will fill the latter so that in the valleys at the juncture of the side edges of each to adjacent liner members 18 there will be formed a generally triangularly-shaped layer of material which is engaged by the blade members 10 so as to provide some vertical and lateral support for the assembly 10. Thus, even though the rate of feed of material to the mixing chamber 7 may vary to the point that the mixing chamber may not be completely full, the assembly 10 always will have some vertical and lateral support so as to minimize the risk that the blades 10 will actually engage the liner members 18.

In the event the material being mixed in the apparatus is abrasive or corrosive, any liners 18 which deteriorate may be replaced without the necessity of replacing all the liners. Regardless of the number of liner members 18 which need to be replace, the separability of the liners from the barrel avoids having to replace the members 2 and 3 forming the barrel 1. In addition, the vanes 10 and the members 20 can be replaced when necessary.

The number of sides provided for the barrel may be fewer or greater than the six sides illustrated. For example, the barrel could have 4, 5, or 8 sides. However, if each of the half members 2 and 3 contains the same number of sides, then either half may be used as a left-hand or right-hand half, thereby making each half of the barrel interchangeable.

In addition to the advantages of the multi-sided barrel previously discussed, the greater surface area provided by the planar sides facilitates temperature control of the material being mixed.

In FIGURE 5 I have shown a slightly modified embodiment of the invention in which the liner plates 18' are provided with arcuate inner surfaces 18a which cooperate to provide an annular mixing chamber of the diameter of the coextensive chamber formed by liner 14a. Substituted fo the teeth members 20 formerly provided are the teeth members 20', which have threaded shanks 20a and are secured in position by the nuts 20b. Otherwise, the elements of this embodiment of the invention are identical with those previously described.

The disclosed embodiments are representative of presently preferred forms of the invention, but are intended to be illustrative rather than definitive thereof. The invention is defined in the claims.

What is claimed is:

1. Mixing apparatus including: tubular barrel means having an inner surface; mixer shaft means rotatably mounted within said barrel means and spaced from said barrel means to form a mixing chamber; interrupted flight mixing blade means carried by said shaft means and extending radially of the latter into said chamber; means providing relative reciprocal and rotary movement of said mixer shaft means and barrel means; lug means mounted on said barrel means to extend into said mixing chamber adjacent the interrupted portions of said blade means in position such that the interrupted blade means interact with but clear the lug means during said relative movement; generally axially split, separable, removably liner means secured to the inner surface of said barrel means; and a plurality of releasable anchor means reactnig between said barrel means and liner means for removably anchoring the latter within said barrel means, selected ones of said anchor means extending radially inwardly from said liner means into the space between said liner means and said shaft means to form said lug means.

2. Mixing apparatus including: tubular barrel means having an inner surface; mixer shaft means rotatably mounted with said barrel means and spaced from said barrel means to form a mixing chamber; interrupted flight mixing blade means carried by said shaft means and extending radially of the latter into said chamber; means providing relative reciprocal and rotary movement of said mixer shaft means and barrel means; lug means mounted on said barrel means to extend into said mixing chamber adjacent the interrupted portions of said blade means in position such that the interrupted blades interact with but clear the lug means during said relative movement; said barrel means including generally axially split, separable, removable liners having substantially axially extending lengthwise edges, secured to the inner surface of said barrel means and forming a perimetral liner body defining the mixing chamber, the radially outer width dimension of said liners being greater than the radially inner width dimension thereof so that said edges abut.

3. Apparatus as set forth in claim 2 wherein said inner surface is polygonal.

4. Apparatus as set forth in claim 2 wherein the width dimension of each of said members is uniform.

5. Apparatus as set forth in claim 2 wherein releasable means acting between said barrel means and said liners are provided for releasably anchoring said liners within said barrel.

6. Apparatus as set forth in claim 2 wherein a plurality of releasable anchor means are provided reacting between said barrel means and said liners for removably anchoring the latter within said barrel means, selected ones of said anchor means extending radially inwardly from said liners into the space between said liners and said shaft means to form said lug means.

7. Apparatus as set forth in claim 2 wherein said barrel means has at one end a materials discharge opening of less cross-sectional area than that of said barrel means.

8. Apparatus as set forth in claim 2 wherein said shaft means comprises a shaft having a series of end-to-end abutting sleeves fixed thereon on which said blade means are mounted.

9. Apparatus as set forth in claim 2 wherein said liners are formed by plate-like members having curvilinear surfaces forming a circular mixing chamber.

10. Apparatus as set forth in claim 2 wherein said barrel means comprises generally axially split members; and means is provided for clamping said members in assembled relation.

11. Mixing apparatus comprising tubular barrel means having a polygonal inner surface; removable liner means thereon; mixer shaft means rotatably mounted within said barrel means and spaced from said liner means to form a mixing chamber; interrupted flight mixing blade means carried by said shaft means and extending radially of the latter into said chamber; means providing relative reciprocal and rotary movement of said mixer shaft means and barrel means; lug means mounted on said barrel means to extend into said mixing chamber adjacent the interrupted portions of said blade means in position such that the interrupted blade means clear the lug means during said relative movement, said liner means being formed by plate-like members having flat inner faces defining contiguous chords about said shaft means; and a plurality of releasable anchor means reacting between said barrel means and said liner members for removably anchoring the latter within said barrel means, selected ones of said anchor means extending radially inwardly from said liner members into the space between said liner means and said shaft means to form said lug means.

References Cited

UNITED STATES PATENTS

| | | | |
|---|---|---|---|
| 663,140 | 12/1900 | Walker et al. | 25—11 |
| 2,519,014 | 8/1950 | Bankey | 18—2 |
| 293,000 | 2/1884 | Fate et al. | 25—14 |
| 840,298 | 1/1907 | Carlson. | |
| 1,732,281 | 10/1929 | Robinson. | |
| 1,971,632 | 8/1934 | Anderson. | |
| 2,411,971 | 12/1946 | MacMillin et al. | |
| 2,731,247 | 1/1956 | Hudry. | |
| 2,738,932 | 3/1956 | Rietz. | |
| 3,023,455 | 3/1962 | Geier et al. | |
| 3,055,074 | 9/1962 | Garvey | 25—14 |
| 3,130,666 | 4/1964 | Hiller. | |
| 3,334,163 | 8/1967 | Gilbert. | |

FOREIGN PATENTS

| | | |
|---|---|---|
| 1,386,698 | 8/1964 | France. |
| 203,764 | 11/1965 | Sweden. |

WILLIAM J. STEPHENSON, Primary Examiner

U.S. Cl. X.R.

18—12